(12) United States Patent
LaPointe et al.

(10) Patent No.: US 7,848,606 B1
(45) Date of Patent: Dec. 7, 2010

(54) ELIMINATING CRYSTALS IN NON-OXIDE OPTICAL FIBER PREFORMS AND OPTICAL FIBERS

(75) Inventors: Michael R. LaPointe, Harvest, AL (US); Dennis S. Tucker, Huntsville, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 439 days.

(21) Appl. No.: 12/047,805

(22) Filed: Mar. 13, 2008

(51) Int. Cl.
*G02B 6/00* (2006.01)
*G02B 6/02* (2006.01)
*C03B 25/00* (2006.01)
*C03B 37/10* (2006.01)
*C03B 37/02* (2006.01)

(52) U.S. Cl. .................. 385/123; 385/142; 65/3.11; 65/434

(58) Field of Classification Search ............ 385/25, 385/134–147, 101, 123; 65/3.11, 3.12, 13, 65/430, 435, 477, 108, 419, 434, 510, 513
See application file for complete search history.

(56) References Cited

U.S. PATENT DOCUMENTS

| | | | |
|---|---|---|---|
| 4,331,463 A * | 5/1982 | Briere et al. | ............ 65/491 |
| 4,645,524 A | 2/1987 | Bocko et al. | |
| 4,897,100 A | 1/1990 | Nice | |
| 5,059,230 A * | 10/1991 | Mollenauer et al. | ............ 65/390 |
| 5,306,322 A | 4/1994 | Ishikawa et al. | |
| 5,776,222 A | 7/1998 | Kopylov et al. | |
| 6,418,757 B1 * | 7/2002 | Berkey et al. | ............ 65/430 |
| 7,016,593 B2 | 3/2006 | Hewak et al. | |
| 2002/0112508 A1 | 8/2002 | Ohba et al. | |
| 2003/0118315 A1 | 6/2003 | Hewak et al. | |
| 2005/0118411 A1 | 6/2005 | Horne et al. | |
| 2005/0135759 A1 | 6/2005 | Wang et al. | |

OTHER PUBLICATIONS

Tucker, D., LaPointe, M., and Jia, Z., "The effects of a magnetic filed on the crystallization of a fluorozirconate glass", Journal of Material Research, Jun. 2007, pp. 1431-1434, vol. 22, No. 6.

* cited by examiner

*Primary Examiner*—Akm E Ullah
(74) *Attorney, Agent, or Firm*—Peter J. Van Bergen; James J. McGroary

(57) ABSTRACT

A method is provided for eliminating crystals in non-oxide optical fiber preforms as well as optical fibers drawn therefrom. The optical-fiber-drawing axis of the preform is aligned with the force of gravity. A magnetic field is applied to the preform as it is heated to at least a melting temperature thereof. The magnetic field is applied in a direction that is parallel to the preform's optical-fiber-drawing axis. The preform is then cooled to a temperature that is less than a glass transition temperature of the preform while the preform is maintained in the magnetic field. When the processed preform is to have an optical fiber drawn therefrom, the preform's optical-fiber-drawing axis is again aligned with the force of gravity and a magnetic field is again applied along the axis as the optical fiber is drawn from the preform.

21 Claims, 1 Drawing Sheet

ELIMINATING CRYSTALS IN NON-OXIDE OPTICAL FIBER PREFORMS AND OPTICAL FIBERS

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to optical fiber processing. More specifically, the invention is a method of eliminating crystals in non-oxide optical fiber preforms and optical fibers drawn therefrom.

2. Description of the Related Art

Signal propagation through traditional silica-based optical fibers is limited by the narrow band of wavelengths they can efficiently transmit. Intrinsic losses due to Rayleigh scattering and infrared absorption limit the effective transmission band of silica to visible and near-infrared wavelengths, with an absolute minimum signal attenuation of 0.16-dB/km at a transmission wavelength of 1.55 µm. In contrast, non-oxide glasses (e.g., chalcogenide glasses and heavy metal fluoride glasses such as "ZBLAN" ($ZrF_4$—$BaF_2$—$LaF_3$—$AlF_3$—$NaF$)) are highly transparent from near ultraviolet to mid-infrared wavelengths. For example, ZBLAN has predicted minimum attenuation coefficients approaching 0.001-dB/km at 2.0 µm. The power of a transmitted signal decreases exponentially as a function of the attenuation of the coefficient and fiber length, hence a 100-fold reduction in the attenuation coefficient has a tremendous impact on both signal quality and propagation distance. The ability to transmit wideband signals through a low-loss fiber over significant distances has substantial commercial and national interest.

Non-oxide glasses are difficult to draw into fibers and tend to crystallize upon cooling. Crystallization causes internal reflection and refraction of the transmitted signal, thereby increasing the attenuation coefficient resulting in significantly degraded fiber performance. Because of crystallization, the best transmission obtained to date with ZBLAN optical fibers is only about 20% of the performance obtained with standard silica-fibers. Performance problems are caused by the low viscosity of the fluoride glasses at the temperatures required to melt and draw the optical fibers. Viscous shear and/or gravity-driven convection cells form within the molten glass fiber during the drawing process, creating crystal structures within the fiber.

SUMMARY OF THE INVENTION

Accordingly, it is an object of the present invention to provide a method of eliminating crystal structures in non-oxide glasses used to make optical fibers.

Another object of the present invention is to provide a method of eliminating crystals in non-oxide optical fiber preforms.

Other objects and advantages of the present invention will become more obvious hereinafter in the specification and drawings.

In accordance with the present invention, a method is provided for eliminating crystals in non-oxide optical fiber preforms. The non-oxide optical preform will have an axis along which an optical fiber is to be drawn. This optical-fiber-drawing axis is aligned with the force of gravity. A magnetic field is applied to the preform as it is heated to at least a melting temperature thereof until crystals in the preform are eliminated. The magnetic field is applied in a direction that is parallel to the preform's optical-fiber-drawing axis. The preform is then cooled to a temperature that is less than a glass transition temperature of the preform while the preform is maintained in the magnetic field. When the processed preform is to have an optical fiber drawn therefrom, the preform's optical-fiber-drawing axis is again aligned with the force of gravity and a magnetic field is again applied along the axis as the optical fiber is drawn from the preform.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

The present invention is a method of processing non-oxide glass optical fiber preforms to eliminate crystal structure therein. The present invention is also a method of drawing non-oxide, optical fibers from the crystal-free preforms to yield crystal-free optical fibers having improved light transmission properties. The non-oxide glasses that will benefit from the present invention's processing include heavy metal fluoride glasses (e.g., "ZBLAN"), chalcogenide glasses, and germanate glasses.

Figure 1:
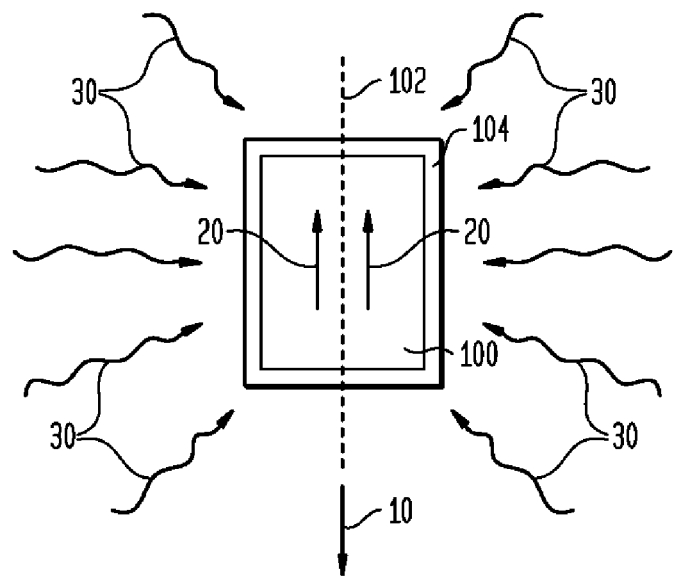
FIG. 1 is a schematic view of a non-oxide optical fiber preform undergoing the magnetic field application and heating steps in accordance with the present invention.
Figure 2:
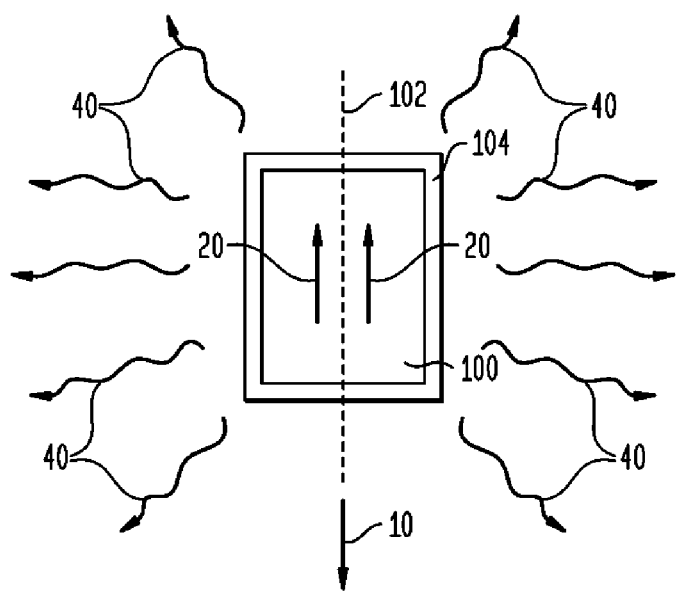
FIG. 2 is a schematic view of the non-oxide optical fiber preform undergoing cooling accordance with the present invention.

Referring now to the drawings, FIGS. 1 and 2 illustrate a non-oxide glass optical fiber preform 100 that is to be processed in accordance with the present invention. In general, preform 100 is a commercially-available, non-oxide optical fiber preform that has an axis 102 along which an optical fiber will be drawn. Typically, preform 100 is cylindrical with axis 102 being a longitudinal axis of the cylinder. As known in the art, such commercially-available preforms incorporate crystal structures (not shown) that reduce the light transmission properties of optical fibers that are to be drawn from the preform. In the drawings, FIG. 1 depicts the first portion of the crystal-eliminating process of the present invention and FIG. 2 depicts the second portion of the crystal-eliminating process.

The present invention uses a combination of heat and magnetic energy to eliminate crystals from non-oxide optical fiber preforms. Since the heat must be sufficient to melt preform 100, a material or housing 104 (provided about preform 100) must have a melting temperature that is greater that the melting temperature of preform 100 so that preform 100 maintains its original shape when it melts. In addition, housing 104 must be a magnetically-permeable material so that preform 100 is exposed to the applied magnetic field. Housing 104 can be a pre-made container in which preform 100 is placed. Housing 104 could also be a material casing deposited on or applied to preform 100.

Prior to the heating thereof, preform 100 in housing 104 is positioned so that longitudinal axis 102 is aligned with the local force of gravity or gravity vector illustrated by downward arrow 10. Typically, such positioning and alignment will occur within a furnace (not shown). With preform 100 so-positioned, a magnetic field (indicated by field lines 20) is applied to preform 100. In the illustrated and preferred embodiment, field lines 20 are parallel to axis 102 with the field being directed opposite to gravity vector 10. However, the present invention is not so limited as field lines 20 could also be in the same direction of gravity vector 10. In either case, the magnetic field can be applied in a variety of ways without departing from the scope of the present invention. For example, preform 100/housing 104 (along with the furnace used to heat same) could be placed within a vertically-oriented superconducting magnet, an electromagnetic field coil, or an arrangement of permanent magnets (none of which are shown for clarity of illustration) that applies field 20 axially along preform 100 as shown.

With magnetic field 20 applied as described, preform 100 is heated as indicated by thermal energy lines 30 directed towards preform 100. The amount of thermal energy must be sufficient to melt preform 100 within housing 104 yet not affect the structural integrity of housing 104. The strength of the magnetic field and the length of time that it is applied to a molten preform 100 are not limitations of the present invention as they will be dependent on the material composition of preform 100 and the amount/types of crystal defects contained in preform 100. In general, these parameters will be selected to assure the elimination of crystals in preform 100. These parameters could be determined empirically or could be adjusted in real-time using a control system that monitored crystal presence in preform 100 and used same to adjust heat, magnetic field strength, time for heating, time for applying the magnetic field, etc.

Once the crystals in preform 100 are eliminated, the second portion of preform processing takes place as illustrated in FIG. 2. In general, preform 100 is cooled while magnetic field 20 is applied thereto in order to prevent crystal formation. More specifically, preform 100 is cooled as indicated by thermal energy lines 40 directed away from preform 100. The cooling of preform 100 can be accomplished using passive cooling techniques, active cooling techniques, or a combination of passive and active cooling techniques without departing from the scope of the present invention. Various types of cooling techniques are well known in the art.

Typically, cooling of preform 100 will be done in two phases. The first cooling phase drops the temperature of preform 100 to its glass transition temperature and holds this temperature for a period of time sufficient to relieve thermal stress in preform 100. This hold time will be dependent on the material selected for preform 100. Magnetic field 20 is maintained during the entirety of this first cooling phase. The second cooling phase allows the temperature of preform 100 to be lowered below its glass transition temperature. For example, the second cooling phase could be complete when the temperature of preform 100 is at an ambient or room temperature. Magnetic field 20 should be maintained for at least the early portion of the second cooling phase, e.g., until the temperature of preform 100 is about 10° C. below its glass transition temperature.

Figure 3:
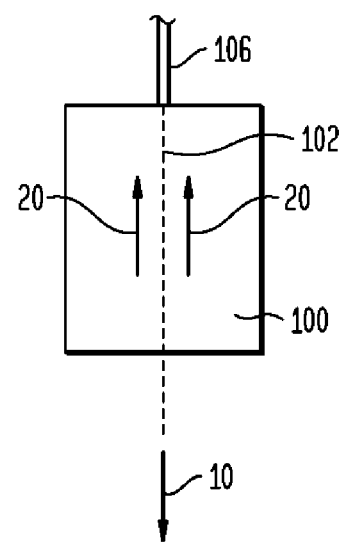
FIG. 3 is a schematic view of the crystal-free non-oxide optical preform being further processed to have an optical fiber draw therefrom in accordance with the present invention.

The advantages of the present invention are numerous. By eliminating crystals from non-oxide optical fiber preforms, the optical fiber that is ultimately drawn from the crystal-free preform will have improved light transmission properties. Further, the teachings of the present invention can be extended to the production of a crystal-free optical fiber. That is, as shown in FIG. 3, after preform 100 has been processed in accordance with the present invention, an optical fiber 106 can be drawn therefrom along axis 102 in a way well known in the art. In accordance with the present invention, optical fiber 106 is drawn as magnetic field 20 is applied with the field lines thereof running parallel to axis 102 as described above. In this way, crystal formation in optical fiber 106 brought on by the drawing process is inhibited.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

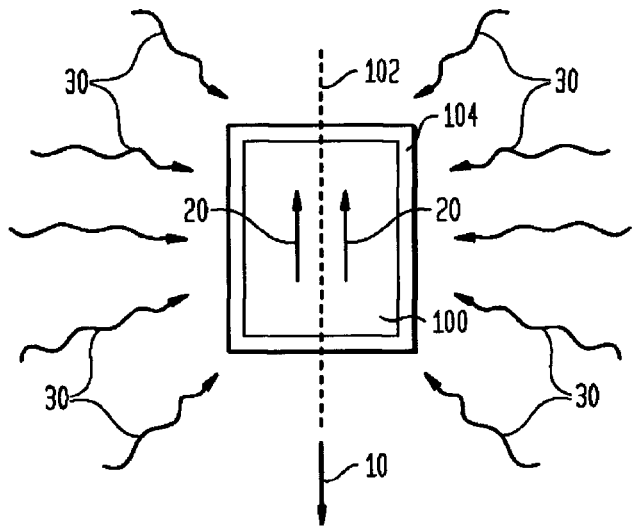

What is claimed as new and desired to be secured by Letters Patent of the United States is:

1. A method of eliminating crystals in an optical fiber preform made from one of heavy metal fluoride glasses, chalcogenide glasses, and germanate glasses, comprising the steps of:
   aligning an axis of said preform with a local gravity vector, said axis defining a direction along which an optical fiber will be drawn from said preform;
   applying a magnetic field to said preform as said preform is heated to at least a melting temperature thereof until crystals in said preform are eliminated, said magnetic field being applied in a direction that is parallel to said axis; and
   cooling said preform to a temperature that is less than a glass transition temperature of said preform while maintaining said preform in said magnetic field.

2. A method according to claim 1 further comprising the step of placing said preform in a magnetically-permeable housing that retains the shape of said preform as said preform is heated to said melting temperature thereof.

3. A method according to claim 1 further comprising the step of encasing said preform in a magnetically-permeable material that will not melt at said melting temperature of said preform.

4. A method according to claim 1 wherein a direction of said magnetic field is opposite to the direction of the local gravity vector.

5. A method according to claim 1 wherein said step of cooling includes the step of holding said preform at said glass transition temperature thereof for a period of time that is sufficient to relieve thermal stress in said preform.

6. A method according to claim 1 wherein said temperature that is less than said glass transition temperature is room temperature.

7. A method according to claim 1 wherein said step of cooling comprises at least one of an active cooling process and a passive cooling process.

8. A method of eliminating crystals in non-oxide optical fiber preforms, comprising the steps of:
   encasing a cylindrical non-oxide optical preform in a magnetically-permeable material having a melting temperature that is greater than a melting temperature of said preform, said preform having crystals formed therein, said preform made from one of heavy metal fluoride glasses, chalcogenide glasses, and germanate glasses;
   positioning said preform so-encased such that a longitudinal axis of said preform is aligned with a local gravity vector;

applying a magnetic field to said preform so-encased such that magnetic field lines associated with said magnetic field are parallel to said longitudinal axis of said preform;

heating said preform so-encased to a first temperature as said magnetic field is applied thereto, said first temperature being at least equal to said melting temperature of said preform but less than said melting temperature of said magnetically-permeable material;

maintaining said steps of applying and heating until said crystals in said preform are eliminated; and cooling said preform to a second temperature that is less than a glass transition temperature of said preform while maintaining said preform so-encased in said magnetic field.

9. A method according to claim 8 wherein a direction of said magnetic field lines is opposite that of the local gravity vector.

10. A method according to claim 8 wherein said step of cooling includes the step of holding said preform so-encased at said glass transition temperature thereof for a period of time that is sufficient to relieve thermal stress in said preform.

11. A method according to claim 8 wherein said second temperature is room temperature.

12. A method according to claim 8 wherein said step of cooling comprises at least one of an active cooling process and a passive cooling process.

13. A method of eliminating crystals in an optical fiber preform made from one of heavy metal fluoride glasses, chalcogenide glasses, and germanate glasses, comprising the steps of:

aligning an axis of said preform with a local gravity vector, said axis defining a direction along which an optical fiber will be drawn from said preform;

applying a magnetic field to said preform in a direction that is parallel to said axis and directionally opposite to the direction of the local gravity vector;

heating said preform to a temperature that causes said preform to melt;

maintaining said steps of applying and heating until crystals in said preform are eliminated;

cooling said preform to a glass transition temperature thereof while maintaining said preform in said magnetic field;

maintaining said step of cooling for a period of time sufficient to relieve thermal stress in said preform; and subsequently cooling said preform to a temperature that is less than said glass transition temperature of said preform.

14. A method according to claim 13 further comprising the step of placing said preform in a magnetically-permeable housing that retains the shape of said preform during said step of heating.

15. A method according to claim 13 further comprising the step of encasing said preform in a magnetically-permeable material that will not melt during said step of heating.

16. A method according to claim 13 wherein each said step of cooling comprises at least one of an active cooling process and a passive cooling process.

17. A method of producing a crystal-free non-oxide optical fiber, comprising the steps of:

aligning an axis an optical fiber preform made from one of heavy metal fluoride glasses, chalcogenide glasses, and germanate glasses with a local gravity vector, said axis defining a direction along which an optical fiber will be drawn from said preform;

applying a first magnetic field to said preform as said preform is heated to at least a melting temperature thereof until crystals in said preform are eliminated, said first magnetic field being applied in a direction that is parallel to said axis;

cooling said preform to a temperature that is less than a glass transition temperature of said preform while maintaining said preform in said first magnetic field to thereby yield a processed preform that retains said axis along which an optical fiber is to be drawn;

aligning said axis of said processed preform with the local gravity vector; and drawing an optical fiber from said processed preform in the presence of a second magnetic field applied in a direction that is parallel to said axis of said processed preform.

18. A method according to claim 17 further comprising the step of placing said preform in a magnetically-permeable housing that retains the shape of said preform as said preform is heated to said melting temperature thereof.

19. A method according to claim 17 wherein a direction of each of said first magnetic field and said second magnetic field is opposite to the direction of the local gravity vector.

20. A method according to claim 17 wherein said step of cooling includes the step of holding said preform at said glass transition temperature thereof for a period of time that is sufficient to relieve thermal stress in said preform.

21. A method according to claim 17 wherein said step of cooling comprises at least one of an active cooling process and a passive cooling process.

* * * * *

UNITED STATES PATENT AND TRADEMARK OFFICE
CERTIFICATE OF CORRECTION

| | | |
|---|---|---|
| PATENT NO. | : 7,848,606 B1 | Page 1 of 1 |
| APPLICATION NO. | : 12/047805 | |
| DATED | : December 7, 2010 | |
| INVENTOR(S) | : Dennis S. Tucker et al. | |

It is certified that error appears in the above-identified patent and that said Letters Patent is hereby corrected as shown below:

On the Title page, item [75], reflect the correct first named inventor Dennis S. Tucker, et al.

Signed and Sealed this
Twenty-fifth Day of January, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,848,606 B1 |
| APPLICATION NO. | : 12/047805 |
| DATED | : December 7, 2010 |
| INVENTOR(S) | : Dennis S. Tucker et al. |

It is certified that error appears in the above-identified patent and that said Letters Patent is hereby corrected as shown below:

Title Page, Item (12) "LaPointe, et al." should be corrected to read --Tucker et al.--, as shown on attached page.

Title Page Item (75) Inventors, should correctly read --Dennis S. Tucker, Huntsville, AL (US); Michael R. LaPointe, Harvest, AL (US)--, as shown on attached page.

This certificate supersedes the Certificate of Correction issued January 25, 2011.

Signed and Sealed this
Twenty-eighth Day of June, 2011

David J. Kappos
*Director of the United States Patent and Trademark Office*

(12) United States Patent
Tucker et al.

(10) Patent No.: US 7,848,606 B1
(45) Date of Patent: Dec. 7, 2010

(54) ELIMINATING CRYSTALS IN NON-OXIDE OPTICAL FIBER PREFORMS AND OPTICAL FIBERS

(75) Inventors: Dennis S. Tucker, Huntsville, AL (US); Michael R. LaPointe, Harvest, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 439 days.

(21) Appl. No.: 12/047,805

(22) Filed: Mar. 13, 2008

(51) Int. Cl.
*G02B 6/00* (2006.01)
*G02B 6/02* (2006.01)
*C03B 25/00* (2006.01)
*C03B 37/10* (2006.01)
*C03B 37/02* (2006.01)

(52) U.S. Cl. .............. 385/123; 385/142; 65/3.11; 65/434

(58) Field of Classification Search .............. 385/25, 385/134–147, 101, 123; 65/3.11, 3.12, 13, 65/430, 435, 477, 108, 419, 434, 510, 513
See application file for complete search history.

(56) References Cited

U.S. PATENT DOCUMENTS

| | | | |
|---|---|---|---|
| 4,331,463 A * | 5/1982 | Briere et al. | .............. 65/491 |
| 4,645,524 A | 2/1987 | Bocko et al. | |
| 4,897,100 A | 1/1990 | Nice | |
| 5,059,230 A * | 10/1991 | Mollenauer et al. | ........... 65/390 |
| 5,306,322 A | 4/1994 | Ishikawa et al. | |
| 5,776,222 A | 7/1998 | Kopylov et al. | |
| 6,418,757 B1 * | 7/2002 | Berkey et al. | .............. 65/430 |
| 7,016,593 B2 | 3/2006 | Hewak et al. | |
| 2002/0112508 A1 | 8/2002 | Ohba et al. | |
| 2003/0118315 A1 | 6/2003 | Hewak et al. | |
| 2005/0118411 A1 | 6/2005 | Horne et al. | |
| 2005/0135759 A1 | 6/2005 | Wang et al. | |

OTHER PUBLICATIONS

Tucker, D., LaPointe, M., and Jia, Z., "The effects of a magnetic filed on the crystallization of a fluorozirconate glass", Journal of Material Research, Jun. 2007, pp. 1431-1434, vol. 22, No. 6.

* cited by examiner

*Primary Examiner*—Akm E Ullah
(74) *Attorney, Agent, or Firm*—Peter J. Van Bergen; James J. McGroary

(57) ABSTRACT

A method is provided for eliminating crystals in non-oxide optical fiber preforms as well as optical fibers drawn therefrom. The optical-fiber-drawing axis of the preform is aligned with the force of gravity. A magnetic field is applied to the preform as it is heated to at least a melting temperature thereof. The magnetic field is applied in a direction that is parallel to the preform's optical-fiber-drawing axis. The preform is then cooled to a temperature that is less than a glass transition temperature of the preform while the preform is maintained in the magnetic field. When the processed preform is to have an optical fiber drawn therefrom, the preform's optical-fiber-drawing axis is again aligned with the force of gravity and a magnetic field is again applied along the axis as the optical fiber is drawn from the preform.

21 Claims, 1 Drawing Sheet